United States Patent [19]

Heaston et al.

[11] Patent Number: 4,763,222

[45] Date of Patent: Aug. 9, 1988

[54] VEHICLE SUSPENSION CONTROL WITH ACTUATING CIRCUIT PROTECTION

[75] Inventors: Bruce A. Heaston, Union; Jeff A. Foust, Farmersville, both of Ohio

[73] Assignee: General Motors Corporation, Detroit, Mich.

[21] Appl. No.: 37,775

[22] Filed: Apr. 13, 1987

[51] Int. Cl.⁴ .............................................. H01H 47/18
[52] U.S. Cl. ................................... 361/195; 361/187; 361/203; 361/170; 361/152; 307/10 R; 307/118; 307/132 EA; 280/6 R; 280/707
[58] Field of Search ......... 280/6 R, 704, 707, DIG. 1; 307/9, 10 R, 118, 132 E, 132 EA; 361/94, 98, 100, 101, 110, 139, 152, 153, 154, 160, 170, 171, 172, 186, 187, 191, 195, 196, 197, 198, 203

[56] References Cited

U.S. PATENT DOCUMENTS

| | | | |
|---|---|---|---|
| 4,105,216 | 8/1978 | Graham et al. | 280/6 R |
| 4,164,664 | 8/1979 | Kasiewicz | 307/118 |
| 4,168,840 | 9/1975 | Graham | 280/6 R |
| 4,430,682 | 2/1984 | Babsch | 361/31 |
| 4,455,587 | 6/1984 | Potthof et al. | 361/160 |
| 4,466,625 | 8/1984 | Kondo et al. | 280/6 R |
| 4,540,188 | 9/1985 | Meloche | 280/6 R |
| 4,618,908 | 10/1986 | Anttila | 361/187 |

Primary Examiner—A. D. Pellinen
Assistant Examiner—Howard L. Williams
Attorney, Agent, or Firm—Robert M. Sigler

[57] ABSTRACT

A motor vehicle suspension control includes a solenoid actuator having an actuating coil connected in series with a transistor across an electric power source and circuit protection apparatus for the transistor. The voltage across the transistor is monitored, after a short time delay following turn-on, as a signal indicative of excessive current therethrough. If the signal so indicates, the transistor is turned off for a period of time and then turned on again for another try. This continues for a predetermined maximum number of attempts. Specific clocked digital circuitry is disclosed for controlling the operation and producing the different required time delays or counts.

2 Claims, 1 Drawing Sheet ns control including a solenoid actuator, the solenoid actuator comprising an actuating coil connected in series with a transistor across an electric power source. It more particularly relates to such a control including protective means for the transistor if a short circuit develops across the actuating coil.

VEHICLE SUSPENSION CONTROL WITH ACTUATING CIRCUIT PROTECTION

BACKGROUND OF THE INVENTION

This invention relates to a motor vehicle suspension control including a solenoid actuator, the solenoid actuator comprising an actuating coil connected in series with a transistor across an electric power source. It more particularly relates to such a control including protective means for the transistor if a short circuit develops across the actuating coil.

This invention is also concerned with minimizing the cost of the vehicle suspension control by combining circuit functions, where possible, in the same circuitry. One of the functions of a vehicle suspension control of the type contemplated is vehicle leveling or height control, in which the control responds to a signal from a vehicle height sensor to actuate apparatus in order to change the height of all or a portion of the vehicle. In order that the control not respond to transient vehicle body movements, a time delay is generally observed for any out of limit height signal before action is taken.

In addition, with regard to the protection of the transistor which controls activation of the actuating coil of the solenoid actuator, it is known that the current in the transistor will be indicated by the voltage across it, and that this can be the basis of a protective circuit. A complication, however, with this approach, is that the voltage across the transistor when it is cut off is sufficiently similar to the voltage when current levels are too high that some confusion may occur. Therefore, when the transistor is first turned on, a short time delay is allowed to occur before the voltage across the transistor is looked at as a feedback signal. This time delay allows the transistor to begin conducting and go into saturation if no circuit errors are present, so that a voltage across the transistor higher than the saturation voltage may be reliably assumed to be indicative of overcurrent and thus a circuit error rather than no current.

Finally, if a voltage across the transistor seemingly indicating out of saturation is detected, the activation of the solenoid is stopped. However, since the voltage may be due to some transient condition, it is desirable to try the activation again after a suitable time delay and to continue to retry, if each is unsuccessful, for a number of such time periods, before giving up. All these time delays provide an opportunity for consolidation of circuitry in a clocked digital system.

SUMMARY OF THE INVENTION

The invention is thus a suspension control for a motor vehicle including a solenoid actuator with an actuating coil connected in series with a transistor across an electric power source, the control comprising means responsive to sensor elements in the suspension control to generate an on signal when a condition is sensed which requires activation of the solenoid after a predetermined time period of the continuous existence of the condition, oscillator means generating pulses at a constant frequency, and counter means responsive to the output of the oscillator means to count the pulses therefrom, the counter means including reset means connected to receive the inverted on signal and being effective to generate an output signal after the appearance of the on signal at a predetermined count corresponding to the predetermined time period at the constant frequency of the oscillator means.

The control further comprises a first bistable latch having first and second stable states, a set input and a reset input, the set input being connected to receive the output of the oscillator means such that, subject to the reset input, the first bistable latch attempts to enter its first bistable state at the end of each oscillator pulse, a first logical AND circuit responsive to the first stable state of the first bistable latch and a voltage at the junction of the solenoid coil and transistor indicating excessive current to generate a short signal, and a second bistable latch having a set input and a reset input, the set input being connected to receive the output of the counter such that, subject to the reset input, the second bistable latch attempts to enter its first stable state with each output signal of the counter means.

The control further comprises a first logical OR circuit connecting the reset input of the second bistable circuit to receive the inverted on signal and the output of the first logical AND circuit such that the second bistable latch is held in its second stable state in the absence of the on signal or the existence of the short signal and a second logical AND circuit responsive to the first stable state of the second bistable latch and the input on signal to generate a drive signal to the transistor and otherwise to generate an off signal to the transistor, the inverted output of the second logical AND circuit being provided to the reset input of the first bistable latch to hold the same in its second stable state when the off signal is generated.

The result is that the transistor is turned on the predetermined time period after the on signal first appears and, if an excessive current is detected after a time delay corresponding to the first oscillator pulse, the transistor is turned off again for a time equal to the predetermined time period before being turned on again. Thus, the clocking and timing apparatus handles all necessary time delays and combines functions relating to the protection of circuit devices with functions relating to the operation of the suspension control. Further details and advantages of this invention will be apparent from the accompanying drawings and following description of a preferred embodiment.

DESCRIPTION OF THE PREFERRED EMBODIMENT

Figure 1:
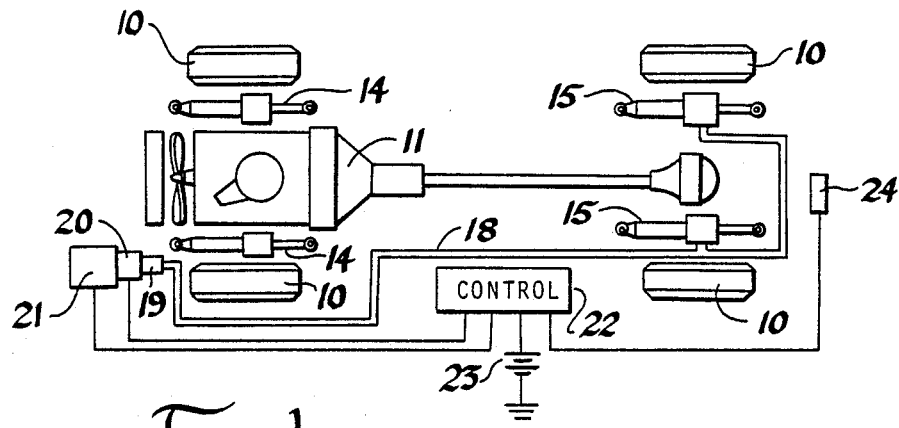
FIG. 1 shows an overall schematic and block diagram of a vehicle suspension system including a suspension control according to the invention.

Referring to FIG. 1, a motor vehicle includes four wheels 10, at least some of which are driven by a drive train 11. Each of the wheels 10 rests on the road surface and comprises part of the unsprung mass of the vehicle. Drive train 11, as well as substantially the remainder of the vehicle, is supported by a frame, not shown, and comprises the sprung mass of the vehicle. This sprung mass is supported by a spring suspension apparatus, not shown, of the normal type. A shock absorber is associated with and adjacent each wheel 10 and is physically connected between the frame of the sprung mass and a portion of the unsprung mass of the vehicle. Shock absorbers 14 are provided at the front of the vehicle for the damping of oscillatory motion between the sprung and unsprung masses at each wheel 10. Shock absorbers 15 of the load leveling type are provided at the rear of the vehicle for the same purpose but additionally include fluid actuated means for adjusting the relative vertical level or height between the sprung and unsprung masses. Equivalent systems will occur to those skilled in the art; and the invention herein is not limited to any particular type of shock, spring or leveling hardware.

In order to adjust the pressure within the load leveling portion of shock absorbers 15, fluid power means are provided. Each of the shock absorbers 15 at the rear of the vehicle is connected through a common conduit 18 to an air drier 19, exhaust valve 20 and compressor 21. Compressor 21 and exhaust valve 20 are controlled by solenoid actuators in response to signals from a control unit 22. The solenoid actuators each comprise an actuating coil and an armature which is normally biased into a first position (off or closed) but is activatable by current through the coil into a second position (on or open). Exhaust valve 20, when closed, allows communication between conduit 18, air drier 19 and compressor 21 but, when open, exhausts conduit 18 to the atmosphere. Air drier 19 provides the air drying function that is typical of such load leveling systems in general.

Control unit 22 adjusts the pressure or air mass of shock absorbers 15 in response to signals from a trim or level sensor 24 of any type known in the prior art which is capable of sending a three valued signal indicative of vehicle height within a trim band, above the band or below the band. Two circuits such as that shown in FIG. 2 may be supplied: one for compressor 21, as shown, and a similar circuit for exhaust valve 20. When the sensor signal indicates below trim, which requires compressor correction, an ON signal is provided to the circuit of FIG. 2 for compressor activation; when the sensor signal indicates above trim band, the ON signal is provided to the other circuit for exhaust activation. The alternate circuit in each case, and each circuit in the case of vehicle height within trim, receives no such signal. Vehicle power supply 23 provides electrical power to control 22 and the other electrical components of the system.

Figure 2:
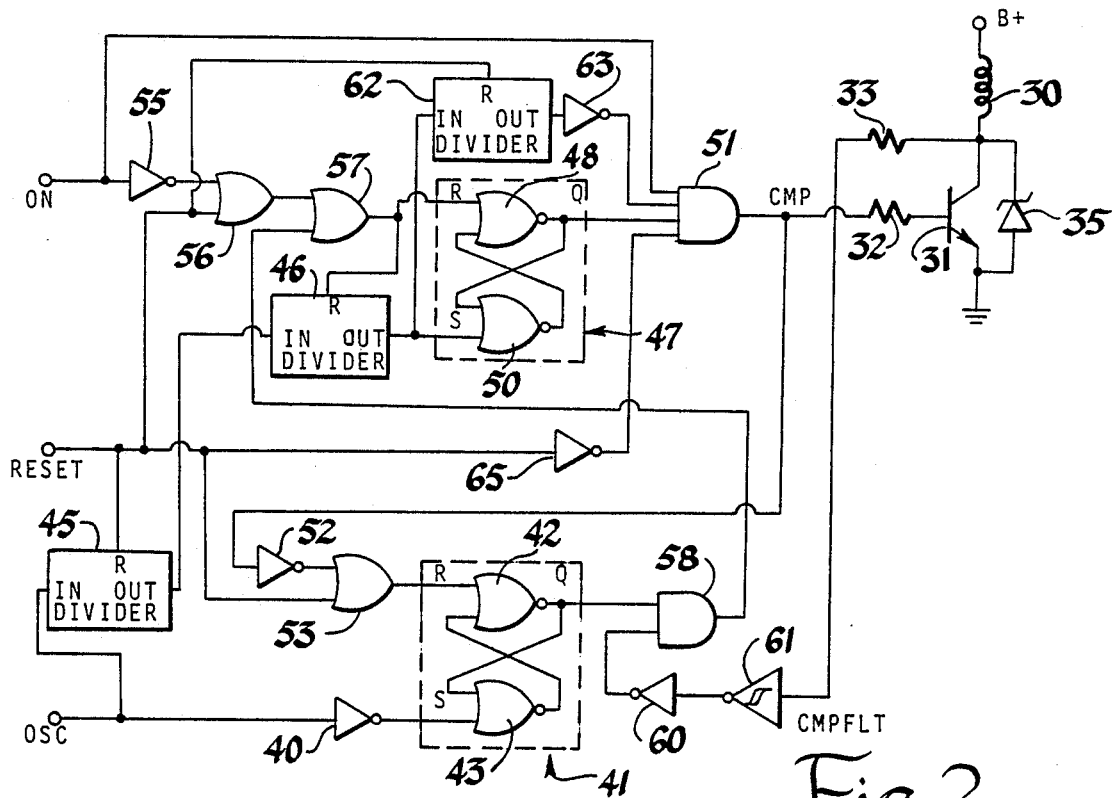
FIG. 2 is a circuit diagram of a portion of the suspension control of FIG. 1 relevant to an understanding of the invention.

Referring to FIG. 2, the particular circuitry most relevant to this invention is shown. An actuating coil 30 is part of an actuating solenoid, as already mentioned, associated with compressor 21. Coil 30 is connected in series with the vehicle power supply, indicated by terminal B+, and a transistor 31. Transistor 31 may be a bipolar transistor or a FET, depending on the precise actuating circuitry desired. In either case, however, it has main conducting electrodes connected to one end of coil 30 and ground and a control electrode connected to receive a CMP signal through a resistor 32. The junction of transistor 31 and coil 30 is connected to provide a CMPFLT signal indicative of the voltage at the junction through a resistor 33. A zener diode 35 is provided across transistor 31 to limit the voltage thereacross during switching of the inductive load of coil 30.

The remainder of FIG. 2 is part of a CMOS custom integrated circuit. The circuit receives an oscillator signal OSC, which comprises a rectangular or square wave at a frequency of, for example, 6.4 KHz. The oscillator may be provided by an on chip oscillator circuit or an external oscillator, many of which are known in the art; and the terminal labeled OSC is understood to represent such an oscillator. Signal OSC is provided through an inverter 40 to the S input of a bistable latch 41 comprising cross connected NOR gates 42 and 43. In particular, the S input of bistable latch 41 comprises one of the inputs of NOR gate 43, with an R input comprising one of the inputs to NOR gate 42 and a Q output comprising the output of NOR gate 42. Latch 41 is thus of the type which is set or reset by a high input signal to the appropriately labeled input with the other input low.

The OSC terminal is also connected to the input of a divider 45. Divider 45 may comprise a series of clocked, sequential toggle flip-flops, with each providing a divide by two over the preceding. Thus, starting with the 6.4 KHz input from terminal OSC, 13 consecutive flip-flops in divider 45 provide an output wave at 0.78 Hz. This output is provided to the input of another divider 46 of a similar nature having an additional 5 flip-flops and thus providing an output at 0.0244 Hz. Each of dividers 45 and 46 has a reset (R) input. In the context of this circuit, dividers 45 and 46, taken together, comprise a counter which counts the number of pulses in the oscillator signal over time. Since the oscillator signal has a predetermined constant frequency, this is equivalent in function to a timer which provides an output leading pulse edge approximately 20 seconds after a reset. A RESET signal is provided to the R terminals of dividers 45 and 46. It will reset these devices when it goes high. The RESET signal may be generated at initial power up by additional circuitry, not shown, which generates a pulse at such initial power up. Such circuitry, well known in the art, is represented by the terminal marked RESET.

The output of divider 46 is connected to the S input of a bistable latch 47, which comprises cross connected NOR gates 48 and 50. The S input of bistable latch 47 is one of the inputs of NOR gate 50; an R input to latch 47 is one of the inputs to NOR gate 48; and a Q output of latch 47 is the output of NOR gate 48. The Q output is connected to one input of an AND gate 51 having an output at which the signal CMP is generated and to which resistor 32 is connected. The output of AND gate 51 is further connected through an inverter 52 to one input of an OR gate 53 having another input receiving the RESET signal. The output of OR gate 53 is connected to the R input of latch 41.

The ON signal already mentioned is provided directly to another input of AND gate 51 and, through an inverter 55, to an input of an OR gate 56, the other input of which receives the RESET signal. The output of OR gate 56 is provided to an input of another OR gate 57 having an output to the R input of divider 46 and the R input of latch 47. The other input of OR gate 57 receives the output of an AND gate 58 having inputs from the Q output of bistable latch 41 and the output of an inverter 60. Inverter 60 has an input connected to the output of a Schmidt inverter 61, which has an input connected to receive the signal CMPFLT. Schmidt inverter 61 is provided with internal hysteresis and customer specifiable switching voltages. For this circuit, voltages of 2.7 and 3.3 volts are appropriate. Thus, the input voltage to Schmidt inverter must go below 2.7 volts to send its output high and must then go above 3.3 volts to send its output low again.

The RESET signal is further provided to the reset (R) input of a divider 62 similar to dividers 45 and 46, divider 62 having an input connected to the output of divider 46 and an output connected through an inverter 63 to another input of AND gate 51. It will become apparent, in the description of operation of the circuit, that divider 62, in the context of this circuit, acts as a counter which counts the number of aborted attempts at turning on transistor 31. A last input of AND gate 51 receives the RESET signal through an inverter 65.

In operation, when the height sensor indicates the vehicle in trim, the ON signal is low, as is RESET. Bistable latch 47 is held reset by the low ON signal through inverter 55 and OR gates 56 and 57. AND gate 51 has a low output, which holds bistable latch 41 reset through inverter 52 and OR gate 53. Transistor 31 is off, since CMP, the output of AND gate 51, is low. Thus, CMPFLT is high; but, the Q output of latch 41 being low, the output of AND gate 58 is low. The OSC signal is applied to latch 41 through inverter 40 but produces no change in its output. Dividers 46 and 62 are held in a reset mode by the ON signal through inverter 55. The system will remain in this state until the ON signal goes high.

When a height sensor senses vehicle height out of trim low, the ON signal to this circuit goes high. This provides a high input on a third input of AND gate 51, the inputs from inverters 63 and 65 already being high but the input from latch 47 still being low. It further sends inverter 55 low to release divider 46 from the reset condition. Divider 46 starts switching internally in response to the signal from divider 45. If the ON signal goes low again before 20 seconds have elapsed, it resets divider 46; and the system reverts to its waiting state as described in the last paragraph. This corresponds to a transient out of trim condition, to which no correction is desired.

However, if the ON signal holds high for 20 seconds, divider 46 switches to a high output and, a low input being present at R, sets latch 47 to a high Q output. All inputs to AND gate 51 now being high, its output goes high to turn on transistor 31 and begin conduction through coil 30. The high output of AND gate 51 also causes inverter 52 to free the R input of latch 41. This occurs some slight propagation delay period after the OSC signal went high on the cycle that caused the switching. When the OSC signal again goes low, latch 41 is set through inverter 40; and its Q output provides a high signal to one input of AND gate 58. If operation of coil 30 and transistor 31 is normal, the voltage across transistor 31 by this time will have decreased below 2.7 volts, whereby the other input to AND gate 58 is low. The output of AND gate 58 will thus stay low; and transistor 31 will be allowed to stay on until the ON signal again goes low or until the voltage across transistor 31 increases above 3.3 volts.

If, when the Q output of latch 41 is high, the voltage across transistor 31 is sufficiently great to cause inverters 61 and 60 to provide a high input to AND gate 58, that gate's output goes high to reset latch 47 and send the output of AND gate 51 low. This turns off transistor 31, even though a high ON signal is still present. It further resets divider 46, which begins another 20 second count or timing. If the high ON signal is still present continuously through this period, at the end of the period latch 47 is set to turn on transistor 31 for another attempt. Meanwhile, divider 62 has counted one aborted attempt. The same operation described above is repeated until the voltage on transistor 31 is sufficiently low to permit continuous operation or until the number of aborted attempts reaches the quantity providing an output switch of divider 62. In the latter case, inverter 63 sends one of the inputs of AND gate 51 low as an error signal to stop the attempts.

It should be noted that divider 62 further acts to time out the apparatus in case of a malfunction such as a leak in conduit 18 which might otherwise allow continuous operation without reaching the correct height. While the ON signal is high and divider 46 counts up to its limit and generates the high output which provides a pulse to divider 62, it continues counting and will, if allowed, provide repeated pulses to divider 62 that will eventually trigger the error signal output from divider 62 already mentioned. The latter will occur if the action of the compressor does not cause the vehicle to get back within the desired trim level and thus send the ON signal low within an allowed time determined by the dividers and oscillator frequency. It may also occur if there are repeated compressor events, such as might result from a slow leak, without an intervening RESET pulse. A RESET pulse may be generated by apparatus, not shown, when the exhaust solenoid is actuated to break the string of consecutive compressor actuations.

Figure 3:
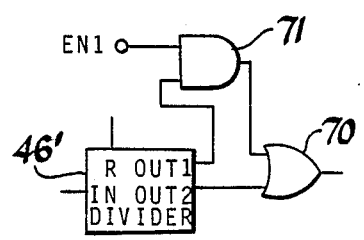
FIG. 3 shows a variation of a portion of the circuit of FIG. 2.

A variation of the circuit of FIG. 2 is shown in FIG. 3. Divider 46 of FIG. 2 is replaced by the circuit of FIG. 3, which includes a divider 46', OR gate 70 and AND gate 71. Divider 46' is identical to divider 46 except that it has at least one additional output, labeled OUT1, OUT2 being the output corresponding to that of divider 46. OUT1 is taken from a preceding flip-flop which switches at a faster frequency than OUT2. For example, if OUT2 provides a 20 second time delay, OUT1 may be taken from the immediately preceding flip-flop for a 10 second time delay or from the third preceding flip-flop for a 2.5 second time delay. OUT1 is enabled by an enabling signal EN1 provided to one input of AND gate 71, the other input being connected to OUT1. The output of AND gate 71 is provided to one input of OR gate 70, the other input being connected to OUT2. The output of OR gate 70 is connected in the circuit of FIG. 2 in place of the output of divider 46; and the R and IN inputs are connected correspondingly with the similar inputs of divider 46. The variation allows selection of one or more time delay periods for suspension modification and/or for repeated transistor turn on attempts under the control of signal EN1.

The embodiments of the invention in which an exclusive property or privilege is claimed are defined as follows:

1. A suspension control for a motor vehicle including a solenoid actuator, the solenoid including an actuating coil connected in series with a transistor across an electric power source, the suspension control comprising circuit protection apparatus comprising, in combination:

means responsive to sensor elements in the suspension control to generate an on signal when a condition is sensed which requires activation of the solenoid after a predetermined time period of the continuous existence of the condition;

an inverter effective to invert the ON signl;

oscillator means generating pulses at a constant frequency;

counter means responsive to the output of the oscillator means to count the pulses therefrom, the counter means including a reset input provided with the inverted ON signal and being effective to generate an output signal after the appearance of the ON signal at a count corresponding substantially to the predetermined time period at the constant frequency of the oscillator means;

a first bistable latch having first and second stable states, a set input and a reset input, the set input being connected to receive the output of the oscillator means such that, subject to the reset input, the first bistable latch attempts to enter its first bistable state at the end of each oscillator pulse;

a first logical AND circuit responsive to the first stable state of the first bistable latch and a voltage at the junction of the solenoid coil and transistor indicating excessive current to generate a short signal;

a second bistable latch having a set input and a reset input, the set input being connected to receive the output of the counter such that, subject to the reset input, the second bistable latch attempts to enter its first stable state with each output signal of the counter means;

a first logical OR circuit connecting the reset input of the second bistable circuit to receive the inverted ON signal and the output of the first logical AND circuit such that the second bistable latch is held in its second stable state in the absence of the ON signal or the existence of the short signal;

a second logical AND circuit responsive to the first stable state of the second bistable latch and the ON signal to generate a drive signal to the transistor and otherwise to generate an OFF signal to the transistor, the OFF signal of the second logical AND circuit being provided to the reset input of the first bistable latch to hold the same in its second stable state, whereby the transistor is turned on the predetermined time period after the ON signal first appears and, if an excessive current is detected after a time delay corresponding to the first oscillator pulse, the transistor is turned off again for a time equal to the predetermined time period before being turned on again.

2. A suspension control as in claim 1 in which the counter means of claim 1 is a first counter means, the suspension control further comprising a second counter means connected to count the output signals from the first counter means and effective, when a predetermined count of the second counter means is achieved, to generate an error signal, whereby an error signal is generated after a predetermined number of successive unsuccessful attempts to turn on the transistor.

* * * * *